United States Patent
Dehnert

[15] 3,697,501
[45] Oct. 10, 1972

[54] BASIC INDAZOLE AZO DYE SUBSTITUTED BY A SULFONAMIDE GROUP

[72] Inventor: Johannes Dehnert, Ludwigshafen, Germany

[73] Assignee: Badische Anilin- & Soda-Fabrik Aktiengesellschaft, Ludwigshafen/Rhine, Germany

[22] Filed: Aug. 22, 1969

[21] Appl. No.: 852,505

[30] Foreign Application Priority Data

Aug. 24, 1968 Germany..........P 17 95 227.1

[52] U.S. Cl.................260/163, 260/146 R, 260/155, 260/156, 260/158, 260/162, 260/310 C
[51] Int. Cl. ........................C09b 29/06, C09b 29/08
[58] Field of Search......260/162, 163, 165, 155, 156, 260/146 R

[56] References Cited

UNITED STATES PATENTS

| | | |
|---|---|---|
| 2,883,373 | 4/1959 | Bossard et al..........260/157 X |
| 3,101,988 | 8/1963 | Bossard et al..........260/163 X |
| 3,360,508 | 12/1967 | Sureau et al...............260/163 |
| 3,524,843 | 8/1970 | Kremer et al..............260/163 |
| 3,257,378 | 6/1966 | Sureau et al...............260/157 |
| 3,417,075 | 12/1968 | Mingasson et al.........260/162 |

Primary Examiner—Floyd D. Higel
Attorney—Johnston, Root, O'Keeffe, Keil, Thompson & Shurtleff

[57] ABSTRACT

A basic azo dye of the formula

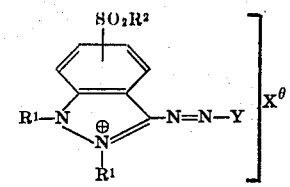

wherein:
$R^1$ is methyl or ethyl, $R^2$ is amino or a substituted amino radical, $X^\ominus$ is an anion, Y is the radical of the formula

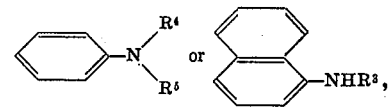

$R^3$ being cyclohexyl, p-methoxyphenyl, p-ethoxyphenyl or p-methylphenyl, $R^4$ being methyl, ethyl, butyl, p-methoxyphenyl or p-ethoxyphenyl and $R^5$ being methyl, ethyl or butyl. These dyes are useful in dyeing textile material of an acrylonitrile polymer or an anionically modified polyester in blue and violet shades with good light and wet fastness properties.

4 Claims, No Drawings

BASIC INDAZOLE AZO DYE SUBSTITUTED BY A SULFONAMIDE GROUP

The invention relates to basic azo dyes devoid of sulfonic acid groups and having the general formula (I):

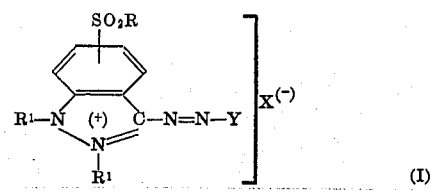

where
R denotes the radical of ammonia or an unsubstituted or substituted aliphatic, cycloaliphatic, araliphatic, aromatic or heterocyclic amine or an unsubstituted or substituted alkyl or aryl radical;
$R^1$ denotes a short chain aliphatic radical;
Y denotes the radical of a nitrogenous isocyclic aromatic or heterocyclic aromatic coupling component which completes the remaining portion of the molecule to form a diazacyanine system; and $X^{(-)}$ denotes the anion of an inorganic or organic acid, and the benzene ring may contain further substituents which are conventional in basic azo dyes.

When the radical $SO_2R$ denotes a substituted sulfonamide group, the radical R is derived from a primary or secondary amine which may contain other substituents besides the amino group. Examples of these substituents are: aryl, aralkyl, alkyl, cycloalkyl, hydroxyl or alkoxy groups, dialkylamino or tetraalkylammonium radicals, carboxylic acid, amide or nitrile groups, acylamino groups, nitro groups, unsubstituted or substituted sulfonamido groups, heterocyclic radicals or halogen atoms.

Specific substituents in addition to those already mentioned are phenyl, cyclohexyl, benzyl, phenylethyl, methyl, ethyl, methoxy, ethoxy, butoxy, phenoxy, N,N-dimethylamide, N-methylamide, N,N-diethylamide, N,N-dimethylsulfonamide, N,N-diethylsulfonamide, N-phenylsulfonamide, acetylamino, propionylamino, chlorine or bromine.

The following amines are given by way of example: methylamine, dimethylamine, ethylamine, diethylamine, β-hydroxyethylamine, propylamine, dipropylamine, butylamine, dibutylamine, 2-ethylhexylamine, di-β-hydroxyethylamine, di-β-methoxyethylamine, methyl-β-hydroxyethylamine, β-methoxyethylamine, γ-methoxypropylamine, benzylamine, phenylethylamine, morpholine, piperidine, hexamethylenimine, thiomorpholine-S-dioxide, 2,6-dimethylmorpholine, cyclohexylamine, pyrrolidine, piperazine, aniline, N-methylaniline, N-β-hydroxyethylaniline, N-ethylaniline, 3-sulfonamidoaniline, 4-sulfonamidoaniline, toluidine, xylidine, phenylglycine, γ-(2-ethylhexoxy)-propylamine, γ-dimethylaminopropylamine, β-thiomorpholinodioxydiethylamine, and 1,2,3,4-tetrahydroquinaldine.

When the $SO_2R$ radical denotes a sulfone group, R may have the following meanings for example: methyl, ethyl, benzyl, β-cyanoethyl, β-carbamoylethyl, β-carboxyethyl, β-carbomethoxyethyl, -carboethoxy-ethyl, phenyl, p-methylphenyl, o-methylphenyl and p-chlorophenyl.

Compounds which together with the diazo components are capable of forming a diazacyanine system are used as coupling components YH. Examples of these coupling components are anilines or aminonaphthalenes capable of coupling in p-position, or heterocycles such as indoles or derivatives of benzothiazole, benzoimidazole, pyridine or trimethylindoline. The coupling components may also contain other substituents such as halogen atoms, alkyl groups or alkoxy groups. The amino nitrogen of the anilines and aminonaphthalenes is preferably monosubstituted or disubstituted.

The following are examples of specific coupling components: N-methylaniline, dimethylaniline, diethylaniline, methyl-β-hydroxy-ethylaniline, methyl-β-cyanoethylaniline, ethyl-β-hydroxyethylaniline, ethyl-β-cyanoethylaniline, methyl-β-methoxyethylaniline, methyl-β-ethoxyethylaniline, ethyl-β-methoxyethylaniline, ethylbenzylaniline, ethylphenylethylaniline, β-cyanoethylbenzylaniline, β-hydroxyethylphenylethylaniline, or N-cyclohexylaniline and the corresponding compounds bearing methyl, ethyl, methoxy, ethoxy, chloro, acetylamino or propionylamino groups as substituents in the ortho- and/or meta-position to the amino group.

The following are further examples:
N-methyl-4-ethoxydiphenylamine,
4-acetylaminodiphenylamine, N-phenylpyrrolidine,
N-phenylmorpholine, N-phenylthiomorpholine dioxide,
1-phenyl-3,3,5-trimethylpyrazoline, tetrahydroquinaldine,
2-methyldihydroindole, indole, 2-methylindole,
1-β-cyanoethyl-2-methylindole, 2-phenylindole,
1-methyl-2-phenylindole, 1-β-cyanoethyl-2-phenylindole,
2-phenylindole-1-propionic acid,
2-phenylindole-1-propionamide, 2-cyanomethylbanzimidazole,
1,3-dimethyl-2-cyanomethylbenzimidazoline,
1,3,3-trimethyl-2-cyanomethyleneindolenine,
1-methyl-4-cyanomethylenedihydropyridine,
2-benzimidazolylacetamide, di-2-benzimidazolylmethane,
di-2-benzothiazolylmethane.

Examples of aminonaphthalenes are:
1-naphthylamine, 1-ethylaminonaphthalene,
1-methylaminonaphthalene, 1-dimethylaminonaphthalene,
1-diethylaminonaphthalene, 1-cyclohexylaminonaphthalene,
1-benzylaminonaphthalene, 1-phenylaminonaphthalene,
1-p-tolylaminonaphthalene, 1-(p-ethoxyphenylamino)-naphthalene,
1-(p-methoxyphenylamino)-naphthalene and 1-(p-acetaminophenyl-amino)-naphthalene.

The benzene ring of the diazo component may contain substituents other than the $SO_2R$ group, such as methyl, methoxy, ethyl, ethoxy, acetylamino, benzoylamino, chlorine or bromine.

It is preferred however to use diazo components which do not contain any of these additional substitutents.

The radical $R^1$ may be for example methyl or ethyl.

Examples of suitable anions are chloride, bromide, nitrate, sulfate, methosulfate, ethosulfate, benzenesulfonate, toluenesulfonate, formate, acetate, tetrachlorozincate and tetrafluoroborate.

The new dyes are blue, violet, red, orange or yellow depending on the coupling components chosen. Since the fastness properties of the new dyes are practically unaffected by the type of substituents in the sulfone and sulfonamide group, all radicals of primary or secondary amines are suitable as substituents for the sulfonamide groups. The choice of amine thus depends to a great extent on practical considerations, particularly (as explained later) on the effect which the SO$_2$R-substituent is to exert on the affinity of the dyes and the rate of dye uptake.

Among the new dyes, those compounds are generally preferred which have the general formula (II):

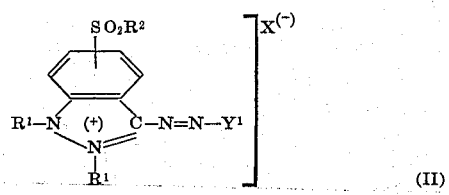

(II)

where R$^2$ denotes the radical of ammonia or of methylamine, dimethylamine, ethylamine, diethylamine, propylamine, dipropylamine, butylamine, dibutylamine, 2-ethylhexylamine, β-hydroxyethylamine, di-β-hydroxyethylamine, di-β-methoxyethylamine, γ-methoxypropylamine, γ-(2-ethylhexoxy)-propylamine, cyclohexylamine, butylamine, β-phenylethylamine, aniline, N-methylaniline, N-ethylaniline, N-β-hydroxyethylaniline, 3-sulfonamidoaniline, 4-sulfonamidoaniline, tolidine, xylidine, phenylglycine, pyrrolidine, piperidine, hexamethylenimine, morpholine, 2,6-dimethylmorpholine, thiomorpholine-S-dioxide, 1,2,3,4-tetrahydroquinaldine, γ-dimethylaminopropylamine or β-aminoethylthiomorpholine-S-dioxide, and Y$^1$ denotes the radical of an aniline, 1-aminonaphthalene, diphenylamine, indole or derivative (capable of being coupled) of benzimidazole, benzothiazole, pyridine or 1,3,3-trimethylindolenine, which completes the remaining portion of the molecule to form a diazacyanine system, and R$^1$ and X$^{(-)}$ have the meanings given for formula (I).

A group of blue dyes which are especially important industrially has the general formula (III):

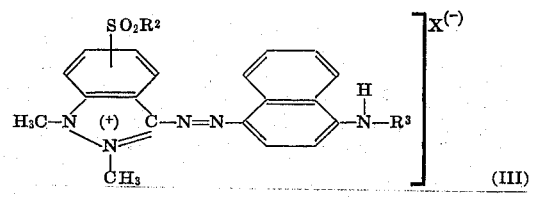

(III)

in which R$^3$ denotes a cyclohexyl, p-methoxyphenyl, p-ethoxyphenyl or p-methylphenyl radical and R$^2$ and X$^{(-)}$ have the meanings given for formula (II).

Particularly valuable violet dyes have the general formula (IV):

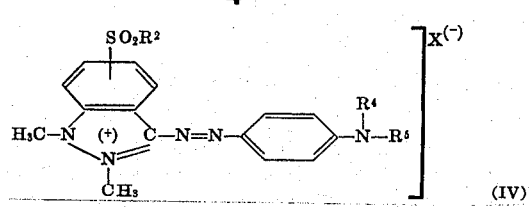

(IV)

in which R$^2$ and X$^{(-)}$ have the meanings given for formula (II), R$^4$ denotes a methyl, ethyl, butyl, p-methoxyphenyl or p-ethoxyphenyl radical and R$^5$ denotes a methyl, ethyl or butyl radical.

Particularly valuable red or orange dyes have the general formula (V):

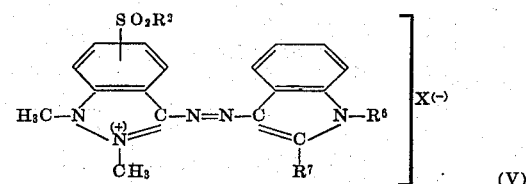

(V)

where R$^2$ and X$^{(-)}$ have the meanings given for formula (II), R$^6$ denotes a hydrogen atom or a methyl group and R$^7$ denotes a methyl group or a phenyl group.

Various methods may be used for the production of dyes having the formula (I) depending on their constitution; some advantageous methods are given below:

1. Reaction of the diazo compound of an amine having the general formula:

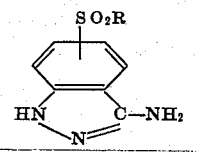

with a coupling component YH followed by alkylation, R and Y having the meanings given for formula (I) and the production being carried out by a conventional method.

2. Introduction of the grouping SO$_2$R, also by a method known from the literature, into an azo dye having the formula:

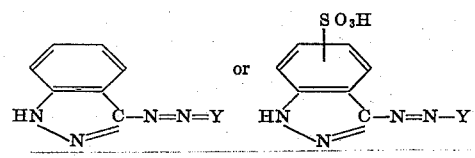

followed by alkylation, R and Y having the meanings given for formula (I).

3. Introduction of the radical SO$_2$R into a basic dye having the general formula:

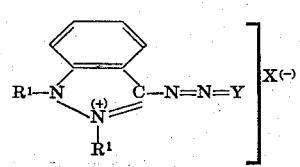

where Y, R$^1$ and X$^{(-)}$ have the meanings given for formula (I).

Of these alternative methods of producing the dyes, alternative (1) is preferred.

Examples of alkylating agents for the production of the dyes in accordance with method (1) or (2) are methyl chloride, methyl iodide, methyl p-toluenesulfonate, diethyl sulfate and particularly dimethyl sulfate.

The reaction is preferably carried out in solvents such as carbon tetrachloride, chloroform, 1,1,1-trichloroethane, 1,1,2,2-tetrachloroethane, ethylene chloride, trichloroethylene, o-dichlorobenzene, trichlorobenzene, toluene, N-methylpyrrolidone or dimethylformamide and preferably in the presence of acid-binding agents such as sodium alcoholate, calcium carbonate, sodium carbonate, magnesium oxide or sterically hindered tertiary aliphatic amines.

The new dye salts are basic dyes whose solubility in water depends on the substituents in the sulfonamido or sulfone group, on the size of the whole molecule and on the type of anion. Water solubility can be controlled to a certain extent by exchanging the anion, for example by preparing the free color base from the fairly difficultly soluble dye chloride or methosulfate by means of alkali and dissolving the free dye base in an acid whose anion renders the dyes more readily soluble. Examples of such acids are nitric acid, formic acid, acetic acid and trichloroacetic acid. Conversely the dye salt may be converted into a salt which is sparingly soluble or are wholly insoluble in water for example by introducing into the dye anions such as tetrafluoroborate, potassium hexacyanoferrate (II) or anions derived from heteropolyacids or dyes containing sulfonic acid groups. Dyes for surface coatings or pigment dyes are thus obtained.

The new soluble dyes may be used (in the form in which they are synthesized or in a finished or dispersed form) for dyeing textile material such as mordanted cotton, leather or materials such as fibers, flock, filaments, threads, film, sheeting, spun goods or woven or knitted fabrics of synthetic materials such as cellulose esters or ethers, polyamides or polyesters, especially when these have been modified by the introduction of anionic groups. They are particularly suitable for dyeing polyacrylonitrile and copolymers of acrylonitrile, very fast dyeings being obtained.

By varying the substituents of the sulfonamido group or sulfone group in the dye molecule, the rate of dye uptake can be controlled to the desired extent so that the combination with known commercial dyes can be achieved in the best possible way. Moreover the introduction of the $SO_2R$ radical into the dyes is accompanied by a desired bathochromic displacement so that the scale of shades is enlarged while retaining the fastness properties by shades which cannot be achieved by dyes not having the $SO_2R$ group.

The invention is illustrated by the following Examples. References to parts and percentages in the following Examples relate to weight unless otherwise stated.

EXAMPLE 1

36 parts of the dye having the formula:

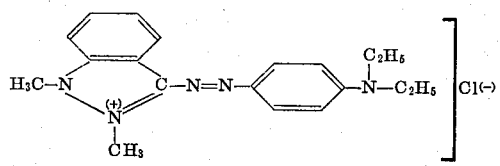

is introduced in small portions into 350 parts of chlorosulfonic acid while stirring and cooling externally. The whole is then heated to 50° C, and the reaction mixture is kept at this temperature for one hour and then slowly introduced into a mixture of ice and water to which ice is added. The moist dye sulfochloride is then isolated by suction filtration and washed with ice-water.

The paste of the dye sulfochloride thus obtained is stirred with 1000 parts of ice and 1000 parts of water. Such an amount of 40 percent dimethylamine solution is gradually added to this mixture that a pH of about 10 is reached and remains constant. About 100 to 120 parts of this dimethylamine solution is required for this purpose. The whole is stirred for several hours and then suction filtered, washed with a little water and dried at 60° C. A dark brown violet powder is obtained which dissolves with a violet color in water and dyes acrylonitrile polymer fibers violet shades having outstanding fastness properties. The dye has the formula:

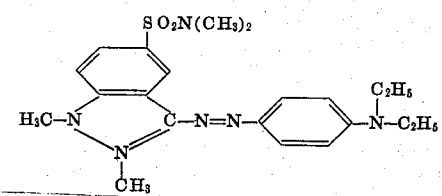

EXAMPLE 2

The moist sulfochloride obtained according to the first paragraph of Example 1 is introduced in small portions at from 0° to 5° C into a mixture of 12 parts of pyrrolidone, 250 parts of ice and 250 parts of water. Care is taken by adding solid sodium carbonate to ensure that the pH value does not fall below 9.5 even after prolonged stirring. The dye salt is isolated as described in Example 1. A dye is obtained which, like the one in Example 1, gives very fast violet dyeings on acrylonitrile polymers.

When appropriate amounts of the following amines are used instead of pyrrolidine, dyes which are very similar in shade and fastness properties are obtained but which differ more or less in their rate of uptake on acrylonitrile polymers:
methylamine, ethylamine, 1-propylamine, 2-propylamine, 1-n-butylamine, 2-ethylhexylamine, 3-(2-ethyl-1-hexoxy)-propylamine, 3-methoxypropylamine, 2-cyanoethylamine, 6-aminocaproic acid, cyclohexylamine, phenylglycine, anthranilic acid, diethylamine, di-n-butylamine, N-methyl-n-butylamine, piperidine, morpholine, thiomorpholine-S-dioxide and 2,6-dimethylmorpholine.

EXAMPLE 3

The whole amount of the dye sulfochloride obtained in the first paragraph of Example 1 is introduced in small portions into a mixture of 16 parts of N-methylaniline and 300 parts by volume of pyridine while stirring and cooling externally. After stirring overnight, the deposited reaction product is isolated by suction filtration and washed several times with water and dried at 80° C. A dark violet powder is obtained which dissolves in hot water with a violet color and dyes acrylonitrile polymer cloth from an acetic acid or sulfuric acid liquor, violet dyeings which have outstanding fastness to light and wet treatments. Basic dyes having similar shades and fastness properties and with different solubilities and different rates of uptake are obtained by using, instead of N-methylaniline, appropriate amounts of aniline, N-hydroxyethylaniline, N-cyanoethylaniline, 1,2,3,4-tetra-hydroquinaldine, 1-aminobenzene-3-sulfamide, 1-aminobenzene-4-sulfanide, 4-chloroaniline, or 2-methoxyaniline.

EXAMPLE 4

A moist paste of the dye sulfochloride prepared according to the first paragraph of Example 1 is introduced into about 600 parts by volume of liquid anhydrous ammonia with external cooling with solid carbon dioxide and methanol. The whole is stirred overnight without external cooling, the ammonia thus for the most part evaporating. The remainder is removed by slight heating and application of subatmospheric pressure. The residue is diluted with 2500 parts of water and adjusted to pH = 4.5 with 30 percent acetic acid. The dye is precipitated as the chloride by adding 800 parts of sodium chloride. This is suction filtered, washed with a little water and dried. The violet powder dissolves in water with a violet color and dyes polyacrylonitrile cloth violet shades having excellent fastness properties.

EXAMPLE 5

The whole of the dye sulfochloride obtained according to the first paragraph of Example 1 is stirred with a solution, cooled to 10° C, of 25 parts of anhydrous sodium sulfite in 250 parts of water and then adjusted to a constant pH OF 9 by slow addition of 25 parts by volume of 50 percent caustic soda solution.

The whole is stirred overnight and then diluted with 1000 parts of water, adjusted with acetic acid to pH = 4.5 and, after 110 parts of acrylonitrile has been added, boiled under reflux while stirring. Excess acrylonitrile is then distilled off. The dye solution which remains is diluted with 1000 parts of water and filtered at 50° C. 5000 parts of ice-water, then 50 parts by volume of 50 percent zinc chloride solution and toward the end 700 parts of sodium chloride are added so that the zinc chloride double salt of the dye is precipitated; this is suction filtered, washed with a little water and dried at 70° C. It is obtained as a dark brown violet powder which dissolves in water with a violet color and gives violet dyeings having very good fastness properties on textiles containing acrylonitrile polymers.

EXAMPLE 6

133 parts of 3-aminoindazole is introduced into 300 parts of acetic anhydride, the mixture heating up to more than 100° C. It is allowed to react on a boiling waterbath and the solidified and comminuted reaction product is then dried at 100° C at subatmospheric pressure.

The acetyl compound which has been ground dustfine is introduced in small portions into 1000 parts of chlorosulfonic acid while stirring and cooling externally. The mixture is heated to 50° C and kept for ninety minutes at this temperature. The moist sulfochloride is isolated by allowing the reaction mixture to flow slowly into a mixture of 2000 parts of ice and 1000 parts of water to which 3000 parts of ice is gradually added, followed by suction filtration and washing with 1000 parts of ice-water.

The sulfochloride is then gradually added to a mixture of 2000 parts of ice, 1000 parts of ice-water and 85 parts of pyrrolidine. By scattering in about 200 parts of sodium carbonate, a pH range of from 9 to 10 is set up. After stirring overnight, the sulfopyrrolidide of 3-acetylaminoindazole obtained is suction filtered, washed with 1000 parts of water and dried at 80° C.

24 parts of this compound is deacetylated by boiling for two hours under reflux in a mixture of 40 parts of concentrated hydrochloric acid and 750 parts of water. The solution is filtered hot and after it has cooled 200 parts of ice and then 23 parts by volume of a 23 percent sodium nitrite solution are added. About thirty minutes later the diazotization is ended and the reaction mixture is slowly allowed to flow at 0° to 5° C into a solution of 19 parts of 1-cyclohexylaminonaphthalene in 1000 parts of N-methylpyrrolidone. After stirring for several hours, the coupling product is isolated as the hydrochloric acid salt by suction filtration and it is washed with 40 percent alcohol. The paste is then stirred with 50 parts of water and sufficient 50 percent caustic soda solution to achieve a pH value of at least 9, suction filtered and washed with water.

The whole of this paste has 1.5 parts of magnesium oxide and 300 parts of chloroform added to it and it is freed from water by entrainment. Then 15 parts by volume of dimethyl sulfate is added to the mixture which is then stirred at boiling temperature under reflux until practically complete methylation has been achieved. This may easily be determined by paper or thin layer chromatography. The reaction product which has been suction filtered and washed with a little chloroform is dried and freed from inorganic impurities by stirring with 300 parts of water and 20 parts by volume of 30 percent acetic acid at room temperature. The dye which is then isolated again and dried having the formula:

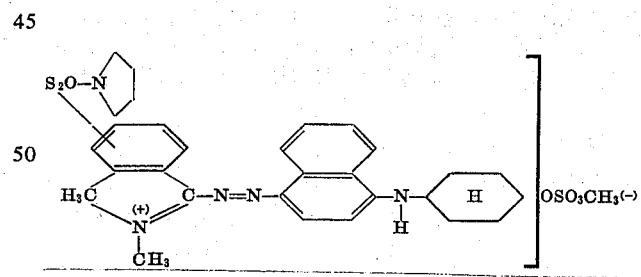

is a blue black powder which dissolves in hot water with a pure blue shade. Textile material containing acrylonitrile polymer is dyed therewith outstandingly light fast and wet fast blue shades from an acetic acid or sulfuric acid bath.

Analogously with the said process, the blue dyes characterized by $R^1$ and $R^2$ in the following Table can be obtained whose fastness properties are practically the same but which vary in affinity, i.e., they go on either at the same rate, more rapidly or more slowly.

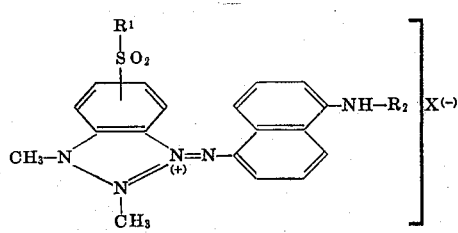

| | R¹ | R² |
|---|---|---|
| 7 | NH—CH₃ | —⟨H⟩ (phenyl) |
| 8 | NH—CH₂—CH₃ | Same as above. |
| 9 | NH—CH₂—CH₂—CH₂—CH₃ | Do. |
| 10 | NH—⟨H⟩ (cyclohexyl) | Do. |
| 11 | NH—CH₂—CH₂—⟨phenyl⟩ | Do. |
| 12 | NH—CH₂—CH₂—OH | Do. |
| 13 | NH—CH₂—CH₂—CH₂—O—CH₃ | Do. |
| 14 | NH—CH₂—CH₂—N⟨ ⟩SO₂ (morpholine sulfone ring) | Do. |
| 15 | NH—CH₂—CH₂—CH₂—N(CH₃)(CH₂) | Do. |
| 16 | NH—CH₂—CH₂—CH₂—CH₂—CH₂—COOH | Do. |
| 17 | N—(CH₃)₂ | Do. |
| 18 | N—(CH₂—CH₃)₂ | Do. |
| 19 | N=(CH₃)(CH₂—CH₂—CH₂—CH₃) | Do. |
| 20 | N—(CH₂—CH₂—O—CH₃)₂ | Do. |
| 21 | N=(CH₃)(CH₂—CH₂—CH₂—OH) | Do. |
| 22 | N(phenyl)—CH₂—COOH | Do. |
| 23 | N(CH₃)—(phenyl-COOH) | Do. |
| 24 | N⟨ ⟩O (morpholino) | Do. |
| 25 | N⟨ CH₃ / CH₃ ⟩O (dimethylmorpholino) | Do. |
| 26 | N⟨ ⟩SO₂ | Do. |
| 27 | N⟨ ⟩ (piperidino) | Do. |
| 28 | NH—⟨phenyl⟩—SO₂—NH₂ | Do. |
| 29 to 52 | R¹ of Examples 6 to 28 | —⟨phenyl⟩—CH₃ |
| 53 to 76 | do | —⟨phenyl⟩—OC₂H₅ |
| 77 | NH—CH₂—CH₂—OCH₃ | Same as above. |
| 78 | NH—CH₂—CH₂—OCH₃ | —⟨H⟩ |
| 79 | NH₂ | Same as above. |

EXAMPLE 80

A mixture of 15 parts of a 77% aqueous paste of the coupling product of 3-aminoindazolesulfonic dimethylamide ⟶1-cyclohexylaminonaphthalene, 1 part of magnesium oxide and 250 parts of chloroform is freed from water by entrainment.

10 parts by volume of diethyl sulfate is then added to the reaction mixture and the whole is boiled under reflux and while stirring until practically complete ethylation has been achieved. A considerably longer period (several days) is required than in methylation and the addition of more diethyl sulfate and magnesium oxide may be necessary. The reaction mixture is then suction filtered while hot and the filter cake is washed with chloroform and suction filtered until dry. The residue is then stirred for a few hours with 500 parts of 2 percent acetic acid, suction filtered, washed with water and dried. The crystals having a metallic luster thus obtained are soluble in hot water and dye acrylonitrile polymer fibers from an acetic acid liquor pure blue shades. The fastness properties of these dyeings are satisfactory in every respect.

EXAMPLE 81

24 parts of 3-acetylaminoindazolesulfonic acid morpholide (obtained analogously to the 3-acetylaminoindazolesulfonic acid pyroolidide in Example 6, paragraph 3) is deacetylated in 300 parts of water and 35 parts of 10 N hydrochloric acid by boiling for one hour. The solution is filtered and cooled. 300 parts of ice and 21 parts by volume of 23 percent sodium nitrite solution are added at once and the whole is stirred for another thirty minutes at 0° to 5° C.

A solution of 13 parts of 1-dimethylaminonaphthalene in 500 parts of water and 16 parts by volume of 10 N hydrochloric acid is allowed to flow gradually into the diazo mixture thus obtained and then about 95 parts by volume of saturated sodium acetate solution is added a little at a time until a pH of 3 has been set up. After stirring overnight, the coupling product is suction filtered, washed with water, stirred again with water and sodium acetate, again suction filtered, washed with water, and dried at 40° C in vacuo.

15 parts of this product is stirred at 65° C with 3 parts of magnesium oxide and 100 parts of methyl p-toluenesulfonate until practically complete methylation has been achieved. 150 parts by volume of chloroform is added and the reaction product is suction filtered, washed thouroughly with chloroform, dried and recrystallized from 2000 parts of 10 percent acetic acid.

The dark blue powder thus obtained dissolves in hot water with a blue color. Blue dyeings having outstanding light fastness and wet fastness are obtained therewith on acrylonitrile polymer fibers.

EXAMPLE 82

The diazo mixtures obtainable analogously to the description in Example 75, paragraph 1, from 24 parts of 3-acetylaminoindazolesulfonic acid morpholide is gradually added at 0° to 5° C to a solution of 18 parts of 1-methyl-2-phenyl-indole in 1000 parts by volume of N-methylpyrrolidone. After coupling is over, the reaction product is isolated by suction filtration and washed with 40 percent alcohol. To prepare the free base, the paste is stirred with a dilute solution of sodium acetate, suction filtered and washed with water.

27 parts of the 64 percent paste thus obtained is freed from water by adding 1 part of magnesium oxide and entraining the water with 250 parts by volume of chloroform. 10 parts by volume of dimethyl sulfate is added and the whole is boiled under reflux while stirring until complete methylation has been achieved. If necessary further additions of dimethyl sulfate and magnesium oxide are made to achieve complete methylation. The reaction mixture is suction filtered while cold, the residue is washed with a little chloroform, sucked dry and dissolved in 500 parts of water and 25 parts by volume of 30 percent acetic acid while heating. 500 parts of ice is added to the filtrate and the whole is allowed to flow into 500 parts by volume of saturated sodium chloride solution. The dye chloride thus obtained is suction filtered, washed with dilute sodium chloride solution and then with a little water and dried at 80° C. A red powder is obtained which dissolves in hot water with an orange red color and gives scarlet dyeings having outstanding light fastness and wet fastness on acrylonitrile polymer fibers. Dyes which are very similar in shade and fastness properties are obtained by using appropriate amounts of 3-acetylaminoinodazolesulfonic anilide, n-butylamide, methylamide, dimethylamide, diethylamide, pyrrolidide or amide instead of the morpholide as the diazo component.

EXAMPLE 83

A solution of 19 parts of 1,3-dimethyl-2-cyanomethylenebenzimidazoline in 11 parts by volume of concentrated hydrochloric acid and 100 parts of water is allowed to flow slowly at 0° to 5° C into a diazo compound of 3-aminoindazole-sulfonic dimethylamide obtained analogously to Example 6, paragraph 4, and then a pH of 3 is set up in the coupling mixture by gradual addition of 200 parts by volume of 50 percent sodium acetate solution. After coupling is over, the reaction product is suction filtered and washed with water. In order to remove hydrochloric acid combined with the coupling product, the paste is stirred overnight with 1000 parts of water and 100 parts of 50 percent sodium acetate solution, suction filtered and washed with water.

The whole of the paste is then stirred with 2 parts of magnesium oxide and 500 parts of chloroform and freed from water by entrainment. 22 parts by volume of dimethyl sulfate is added and the whole is stirred at from 62° to 63° C (internal temperature) until complete methylation has been achieved. The reaction product is isolated by suction filtration, washed with a little chloroform, sucked dry and dissolved in 1000 parts of hot water. The dye is precipitated from the filtered solution in the form of the tetrachlorozincate by adding 40 parts by volume of 50 percent zinc chloride solution and 400 parts by volume of saturated sodium chloride solution. After suction filtration, washing with a little water and drying at 80° C, a yellow powder is obtained which dissolves in warm water with a yellow color and produces outstandingly fast yellow dyeings on polyacrylonitrile knitted material. Dyes having similar shade and fastness properties after methylation are obtained by using (instead of 3 -aminoindazolesulfonic acid dimethylamide) equimolar amounts of 3-amino-indazolesulfonic acid anilide, piperidide or butylamide as the diazo component.

EXAMPLE 84

The diazo compound of 3-aminoindazolesulfonic dimethylamide obtainable analogously to the description in Example 6, paragraph 4 is added gradually to a solution, cooled to 0° to 5° C, of 20 parts of 1,3,3-trimethyl-2-cyanomethyleneindolenine in 1200 parts of N-methylpyrrolidone. The whole is stirred overnight and the coupling product is suction filtered, washed with water, stirred with dilute sodium acetate solution, again suction filtered and washed with water.

2.5 parts of magnesium oxide and 700 parts by volume of chloroform are added to the whole of the paste thus obtained and water is removed by entrainment. 30 parts by volume of dimethyl sulfate is added and the reaction mixture is boiled under reflux while stirring until complete methylation has been achieved. The reaction product is suction filtered while hot, washed thoroughly with chloroform, sucked dry, dissolved in 4000 parts of hot water and filtered. The hot filtrate has added to it 50 parts by volume of 30 percent acetic acid, 50 parts by volume of 50 percent zinc chloride solution and at the end 4000 parts by volume of saturated sodium chloride solution; the dye is deposited in the form of the tetrachlorozincate. This is suction filtered, washed with a little water and dried at 80° C. A red powder is thus obtained which dissolves in water with an orange red color and dyes acrylonitrile polymer cloth scarlet shades having excellent fastness properties. Dyes having similar properties are obtained by replacing the dimethylamide of 3-aminoindazolesulfonic acid by the appropriate amount of the cyclohexylamide, diethylamide or 3-methoxypropylamide.

EXAMPLE 85

A mixture of 45 parts of a 43% aqueous paste of the coupling product of 3-aminoindazolesulfonic dimethylamide → 2-methylindole, 4 parts by volume of 50 percent caustic soda solution and 500 parts by volume of chloroform is freed from water by entrainment. 2 parts of dried magnesium oxide and 20 parts by volume of dimethyl sulfate are added and the whole is stirred at 62° to 63° C until complete methylation has taken place. The reaction mixture is suction filtered while still warm. The filter cake is washed with chloroform, sucked dry and recrystallized from 1300 parts by volume of 30 percent acetic acid. After having been cooled, the dye which has crystallized out is suction filtered and washed with a little water. The dried dye dissolves in hot water with an orange color and gives outstandingly fast dyeings in an orange shade of acrylonitrile polymer cloth. Methylation products having similar tinctorial properties are obtained by using the methylamide, n-butylamide, morpholide or N-methylanilide of 3-aminoindazolesulfonic acid as the diazo component.

EXAMPLE 86

40 parts of a 67% aqueous paste of the coupling product of 3-aminoindazolesulfonic acid dimethylamide ──── N-methyl-4-ethoxydiphenylamine is dehydrated by entrainment after adding 1.5 parts of magnesium oxide and 300 parts by volume of chloroform. 15 parts by volume of dimethyl sulfate is added and the reaction mixture is stirred at 62° C until only the dimethylated violet reaction product is detectable. This is isolated by suction filtration, washed with chloroform, dried and recrystallized from 1750 parts by volume of 10 percent acetic acid. The dye is suction filtered and dried. It dissolves in hot water with a violet color and produces bluish violet dyeings having outstanding light fastness and wet fastness on polyacrylonitrile fibers.

EXAMPLE 87

Half of the moist paste of the 3acetaminoindazolesulfonyl chloride obtained according to Example 6, paragraph 2, is introduced while stirring and cooling externally with a mixture of dry ice and methanol into about 1000 parts by volume of liquid anhydrous ammonia. Without further cooling, the major portion of the ammonia is evaporated by stirring the reaction mixture overnight and the remaining ammonia is removed under subatmospheric pressure, the reaction vessel being heated to 55° C. After cooling, the deposited sulfamide is suction filtered, washed with 250 parts of water and dried at 80° C. 25 parts of this compound is boiled under reflux in a mixture of 500 parts of water and 50 parts by volume of 10 N hydrochloric acid for two hours. 300 parts of ice is added to the hot filtered solution and then at 0° to 5° C 25 parts by volume of 23 percent sodium nitrite solution is added.

The diazotization mixture thus obtained is allowed to flow while cooling externally into a solution of 23 parts of 1-(4-ethoxyphenylamino)-naphthalene in 1250 parts by volume of N-methylpyrrolidone. After stirring overnight, the coupling product is precipitated in the form of its hydrochloric acid salt by gradual addition of a mixture of 5000 parts of ice-water and 250 parts of 10 N hydrochloric acid. The hydrochloride is suction filtered, washed with water and then stirred for several hours with 1000 parts of water with an addition of caustic soda solution (up to pH = 10). The product which has partly gone into solution is completely precipitated again by adding 200 parts by volume of saturated sodium chloride solution. After suction filtration and washing with a little water, a moist paste is obtained which is dehydrated by entrainment with 1000 parts by volume of chloroform in the presence of 4 parts of magnesium oxide. The reaction mixture then has 45 parts of dimethyl sulfate added to it and it is boiled under reflux while stirring until only the blue dimethylation product is to be detected. The sulfamide group is not methylated under these conditions. The residue obtained by suction filtration while hot followed by washing with chloroform is dried, intensely stirred with 500 parts of 3% acetic acid, suction filtered, washed with a little water and dried at 80° C.

The bluish black powder dissolves in hot water with a blue color. Blue dyeings obtained therewith are distinguished by excellent fastness properties.

EXAMPLE 88

24 parts (aqueous paste calcd 100 percent) of the dye 3-aminoindazolesulfonic acid-3'-methoxypropylamide → 2-phenylindole is dehydrated by entrainment with 400 parts by volume of chloroform in the presence of 2 parts of magnesium oxide. Then 20 parts by volume of dimethyl sulfate is added and the mixture is kept at about 62° C while stirring until complete methylation has taken place. The dye isolated by suction filtration while hot and washing with chloroform is dried, dissolved in 1000 parts by volume of 1.5 percent acetic acid while hot and filtered. The filtrate is allowed to flow while stirring into a mixture of 1000 parts by volume of ice-water and 1000 parts by volume of saturated sodium chloride solution. The deposited dye chloride is suction filtered, washed with a little water and dried. A red water-soluble powder is thus obtained whose red solutions dye acrylonitrile polymer textile materials outstandingly fast red shades. Basic dyes which are similar in shade and fastness properties but go on at different rates are obtained by using as diazo components amides of 3-aminoindazolesulfonic acid which have been derived from the following amines: methylamine, dimethylamine, ethylamine, diethylamine, 2-hydroxyethylamine, pyrrolidine, morpholine or phenylglycine.

EXAMPLE 89

30 parts of acrylic acid is introduced at 20° to 25° C (at pH = 3.5) into the solution of the dye sulfinic acid (pH = 9) obtained according to Example 5, paragraph 1. After stirring overnight at the same temperature, the mixture is diluted with 7000 parts of ice-water and the dye is precipitated as the tetrachlorozincate by the addition of 1000 parts of sodium chloride and 50 parts by volume of 50 percent zinc chloride solution. The precipitate is suction filtered and dried at 50° C. A brown violet powder is obtained whose violet aqueous solutions dye cloth containing polyacrylonitrile violet shades of excellent fastness properties from an acetic acid of sulfuric acid liquor.

EXAMPLE 90

47 parts of a 48% aqueous filter cake of the compound having the formula:

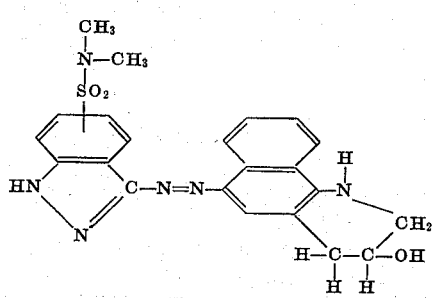

together with 1.5 parts of magnesium oxide and 500 parts by volume of chloroform is dehydrated by entrainment, then 15 parts by volume of dimethyl sulfate is added and the whole is boiled under reflux while stirring until no more starting product and practically no monomethylated compound can be detected. The reaction product is suction filtered while hot, washed with chloroform and dried. It is dissolved in 2000 parts of 30 percent acetic acid while hot and filtered. The dye chloride is precipitated from the filtrate by adding 400 parts of sodium chloride. The isolated and dried dye gives fast blue dyeings on polyacrylonitrile fibers from an acetic acid liquor.

EXAMPLE 91

Half of the paste of the 3-acetaminoindazolesulfonyl chloride obtained according to Example 4, paragraph 2, is stirred at 10° C into a solution of 126 parts of anhydrous sodium sulfite in 1000 parts of water and kept at pH = 9 to 9.5 by adding dilute caustic soda solution. The filtered solution is then boiled with 250 parts of acrylonitrile for several hours under reflux while stirring. The reaction product is cooled, suction filtered, washed with 250 parts of water and dried.

15 parts of the 3-acetaminoindazole-β-cyanoethylsulfone thus obtained is boiled in a mixture of 250 parts of water and 25 parts by volume of 10 N hydrochloric acid for 2 hours under reflux while stirring. The solution is filtered while hot and then added to 250 parts of ice, 15 parts by volume of 23 percent sodium nitrite solution is added and the whole is stirred for thirty minutes at 0° to 5° C. Then the diazo mixture is introduced at 0° to 5° C into a solution of 17 parts of 1-(4'-ethoxyphenylamino)-naphthalene in 1000 parts by volume of N-methylpyrrolidone. When coupling is over, the dye is precipitated by gradual addition of 500 parts by volume of 10 N hydrochloric acid and 2000 parts of ice-water, suction filtered and washed with water. The paste is then stirred with a mixture of 1000 parts of water and 15 parts by volume of 10 percent caustic soda for some hours at pH = 9, then filtered again, washed with water and, after adding 500 parts by volume of chloroform and 1.5 parts of magnesium oxide, dehydrated azeotropically. 15 parts by volume of dimethyl sulfate is added and the reaction mixture is boiled under reflux while stirring until complete methylation has taken place. The reaction product is suction filtered while hot and dried. It is freed from inorganic products by stirring with a little dilute acetic acid, washed with a little water and dried. The blue black powder dissolves readily in hot water with a blue color and gives outstandingly fast blue dyeings on cloth containing polyacrylonitrile. The dye probably has the formula:

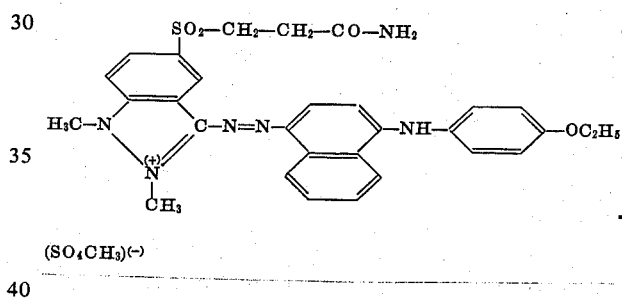

$(SO_4CH_3)^{(-)}$

EXAMPLE 92

The reaction mixture obtained according to Example 5, paragraph 1, is allowed to stand for several days. A dark violet crystal powder forms which is suction filtered, washed with a little water and dried at 60° C under subatmospheric pressure. It probably has the formula:

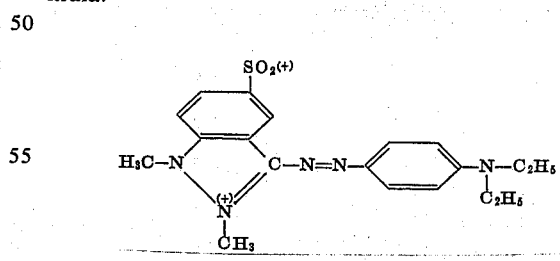

4 parts of this compound as a dry powder is stirred for a few hours at 62° to 63° C with 150 parts by volume of chloroform, 0.4 part of magnesium oxide and 2 parts by volume of dimethyl sulfate. Complete methylation to the methylsulfone can easily be established by comparative thin layer chromatography. When the reaction is over, the chloroform is distilled off under subatmospheric pressure and at the same time a mixture of 10 parts by volume of 30 percent acetic acid and 250 parts of water is added. The solution is filtered while hot, diluted with 500 parts of water, cooled and the dye is precipitated as the tetrachlorozincate by adding 150 parts of sodium chloride and 5 parts by volume of a 50 percent solution of zinc chloride. The precipitate is suction filtered, washed with dilute sodium chloride solution and dried at 80° C. The dye is obtained as a black violet powder. It is readily soluble in water with a violet color and dyes acrylonitrile polymer fibers outstandingly fast violet shades.

I claim:

1. A basic azo dye of the formula

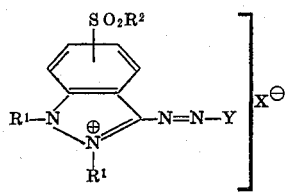

wherein:

$R^1$ is methyl or ethyl, $R^2$ is amino, methylamino, dimethylamino, ethylamino, diethylamino, propylamino, dipropylamino, benzylamino, dibutylamino, 2-ethylhexylamino, β-hydroxyethylamino, di-β-hydroxyethylamino, β-methoxyethylamino, di-β-methoxyethylamino, γ-methoxypropylamino, γ-(2-ethylhexoxy)-propylamino, cyclohexylamino, butylamino, β-phenylethylamino, anilino, N-methylanilino, N-ethylanilino, N-β-hydroxyethylanilino, 3-sulfonamidoanilino 4-sulfonamido-anilino, tolidino, xylidino, phenylglycino, pyrrolidono, piperidino, hexamethylenimino, morpholino, 2,6-dimethylmorpholino, thiomorpholino-S-dioxide, 1,2,3,4-tetrahydroquinaldino, γ-dimethylaminopropylamino or β-aminoethylthiomorpholino-S-oxide $X^\ominus$ is an anion and Y is the radical of the formula

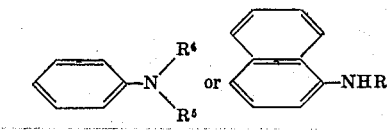

$R^3$ being cyclohexyl, p-methoxyphenyl, p-ethoxyphenyl or p-methylphenyl, $R^4$ being methyl, ethyl, butyl, p-methoxyphenyl or p-ethoxyphenyl and $R^5$ being methyl, ethyl or butyl.

2. A basic azo dye as claimed in claim 1 wherein the anion X is chloride, bromide, nitrate, sulfate, methosulfate, ethosulfate, benzenesulfonate, toluenesulfonate, formate, acetate, tetrachlorozincate or tetrafluoroborate.

3. A basic azo dye as claimed in claim 2 wherein the cation has the formula

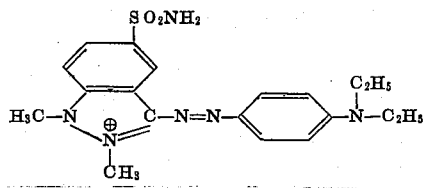

4. A basic azo dye as claimed in claim 2 wherein the cation has the formula

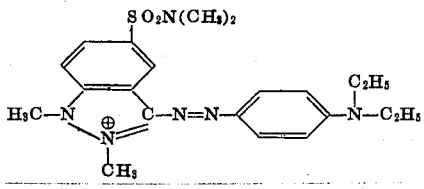

* * * * *